Figure 1:
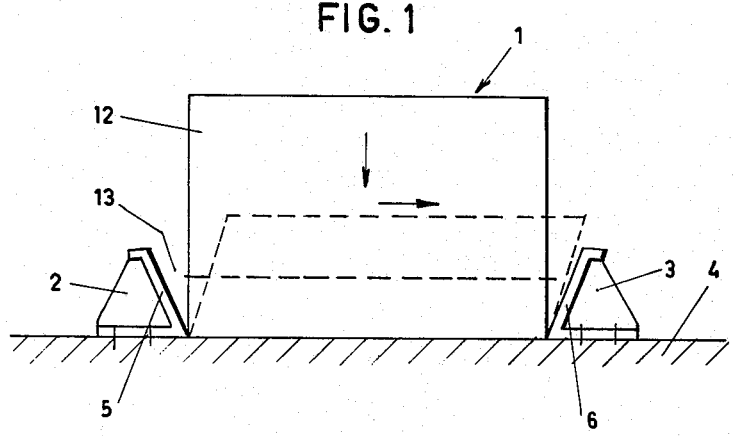

United States Patent [19]
Kramer

[11] 3,917,247
[45] Nov. 4, 1975

[54] FENDER
[75] Inventor: Hendrikus Kramer, Puccinidreef, Netherlands
[73] Assignee: International B. F. Goodrich-Europe B.V., The Hague, Netherlands
[22] Filed: Sept. 11, 1973
[21] Appl. No.: 396,305

[30] Foreign Application Priority Data
Sept. 20, 1972 Netherlands.......................... 7212739

[52] U.S. Cl.................................. 267/140; 114/219
[51] Int. Cl.² ........................................ E02B 3/22
[58] Field of Search ........... 114/219; 61/48; 293/88; 167/139, 140, 141

[56] References Cited
UNITED STATES PATENTS
3,096,973  7/1963  Bergen........................... 114/219 X
3,338,206  8/1967  Motter............................... 114/219

FOREIGN PATENTS OR APPLICATIONS
682,178  2/1965  Italy..................................... 114/219

Primary Examiner—Trygve M. Blix
Assistant Examiner—Gregory W. O'Connor
Attorney, Agent, or Firm—Karl W. Flocks

[57] ABSTRACT

A fender comprising a thick-walled cylinder of rubber, synthetic rubber or an elastic synthetic material, and a suspension structure adapted to be secured to a quay wall comprising at least one shaft or a frame structure and two rigid consoles provided with slots and adapted to be secured to the quay wall, with the aid of which the fender can be suspended on the quay wall, each of the sides of the consoles of the suspension structure facing the cylinder forming an angle with the opposite end face of the cylinder in unloaded condition.

4 Claims, 7 Drawing Figures

FENDER

This invention relates to a fender comprising a suspension structure adapted to be secured to a quay wall and a thick-walled cylinder of rubber, synthetic rubber or an elastic synthetic material, provided with at least one shaft or a frame structure, and two rigid consoles provided with slots and adapted to be secured to the quay wall.

In the case of these known fenders the thick-walled cylinder is suspended between console walls extending respectively to a quay wall, the consoles being secured with the aid of bolts to the quay wall. The forces exerted by a mooring vessel normal to the fender are transferred directly by the thick-walled cylinder onto the quay and consequently the consoles are not loaded. The forces produced by the friction between the ship's hull and the fender parallel to the quay wall, both in horizontal direction for a horizontally suspended fender and in vertical direction for a vertically suspended fender are transmitted, however, via the suspension structure onto the quay. As in this way the supporting structure is very heavily loaded said supporting structure must be secured to the quay wall with a large number of bolts which in the case of large fenders entails the use of an unacceptably large number of bolts.

The invention aims at avoiding this drawback specifically in the horizontal direction for a horizontally suspended fender or in the vertical direction for a vertically suspended fender, which is accomplished with the fender according to the invention in that each of the sides of the consoles of the suspension structure facing the cylinder extends at an angle relative to the opposite end face of the cylinder in unloaded condition. As a result of this construction of the fender it functions in a much more flexible way since the cylinder material can also move along with the ship's movement parallel to the quay wall. According to the invention the walls of the suspension structure facing the cylinder or the end faces of the cylinder may be inclined so that there are clearances between the end faces of the cylinder and the corresponding walls of the suspension structure projecting from the quay wall. In the former case the end faces of the thick-walled cylinder extend perpendicularly to its centre line whereas in the latter case the cylinder walls projecting from the quay wall are perpendicular to said quai wall. Obviously it is also possible to have both the end faces of the cylinder and the end portions projecting from the quay wall incline in opposite sense. The angles of inclination of said end faces and said walls projecting from the quay wall need not be equally large.

A preferred embodiment of the fender according to the invention is characterized in that the angle at which each of the end faces of the cylinder in unloaded condition extends relative to the corresponding side of the consoles of the suspension structure facing said cylinder exceeds the maximum shearing angle of the cylinder. Thus the advantage is arrived at that at a maximum deformation of the cylinder the end faces of the cylinder do not come into contact with the corresponding walls of the suspension structure projecting from the quay wall.

According to the invention the suspension structure, when having diverging walls projecting from the quay wall, may comprise open slots cams being provided on the ends of the or each shaft or frame structure. In the event of such a fender being fixed to a quay wall the cams are mounted after arranging the shaft or frame structure with the cylinder, on the ends of said shaft or frame structure. After the distance between the cams has been selected said distance defines the magnitude of the movement of the shaft ends or the ends of the frame structure in the slots.

If one wishes to shorten the walls projecting from the quay wall the ends thereof may be provided at the outside with a projecting rim or projecting parts serving as a stop for the movement of the cams. According to the invention between the cams and the side walls of the consoles of the suspension structure there can be arranged plates provided with slots, the ends of said plates comprising at the outside an abutment face for the cams. In the case of this embodiment the cams can be arranged on the shaft ends or the ends of the frame structure before these are arranged in the slots of the walls of the fender projecting from the quay wall. The cams and the shaft ends or ends of the frame structure may thereby be integral. After the provision of the shaft or shafts or of the frame structure respectively the plates are secured to the projecting walls with the aid of bolts.

It is preferred according to the invention that the side of the cams facing the side walls of each of the consoles of the suspension structure is inclined at the same inclination as said side walls.

A preferred embodiment of the fender according to the invention is characterized in that the ends of the or each shaft or of the frame structure are inclined towards the consoles of the suspension structure serving to secure said suspension structure to a quay wall. In this way the advantage is arrived at that in case the fender is loaded the load exerted on the fastening bolts of the suspension structure is reduced so that consequently these bolts may be thinner or a smaller number of bolts may be used.

The invention will be further explained below with reference to the drawings showing by way of example same embodiments of the fender according to the invention.

The drawings show in

Figure 2:
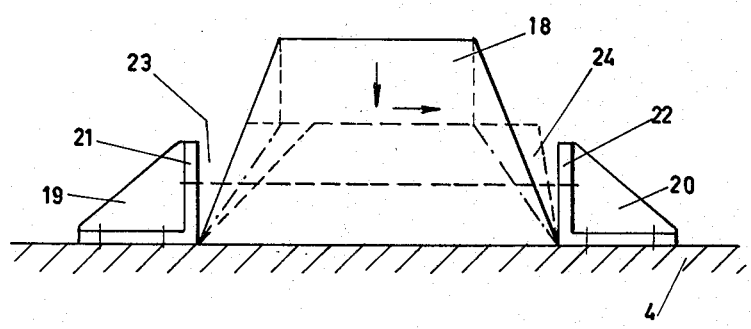
Figure 3:
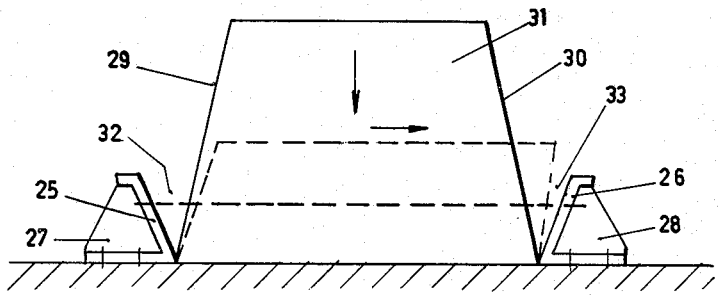
Figure 4:
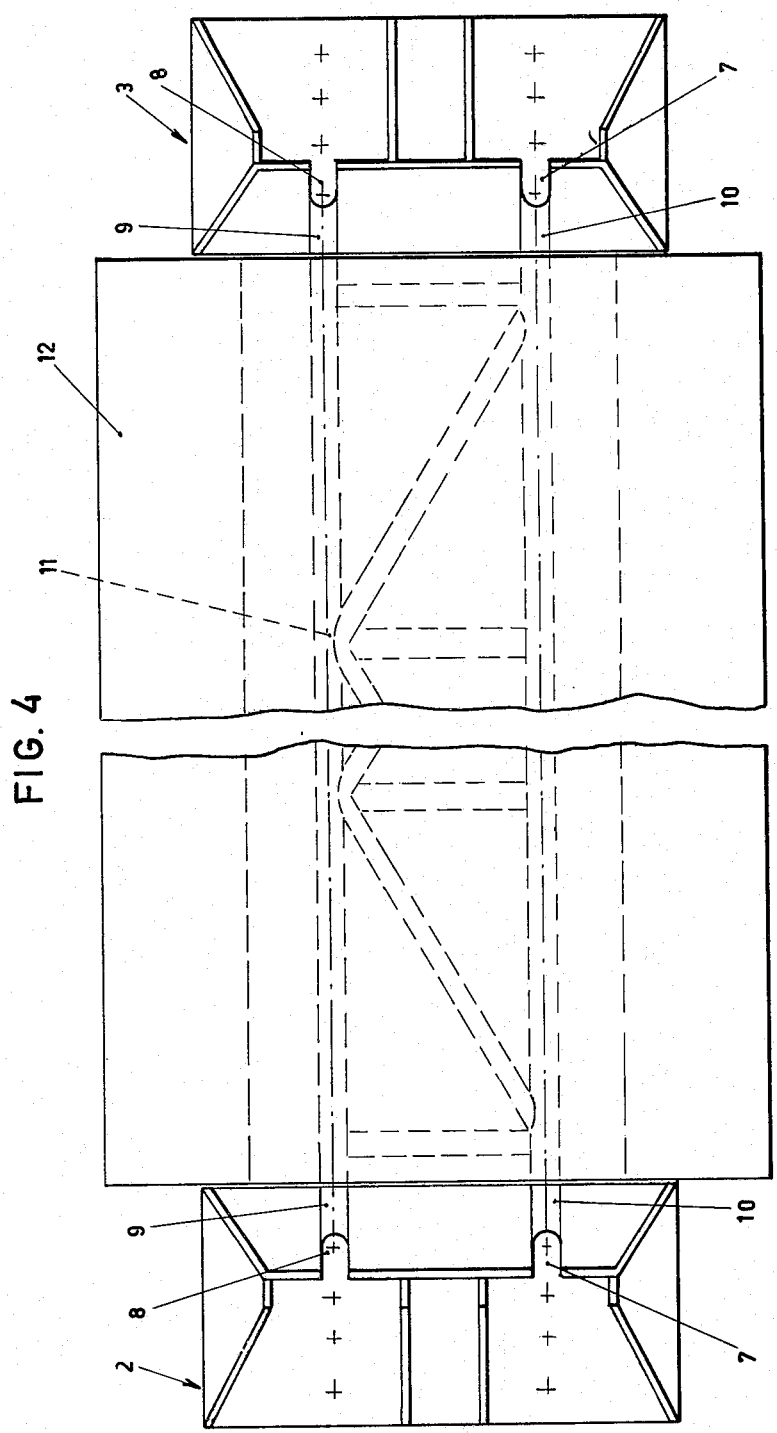
Figure 5:
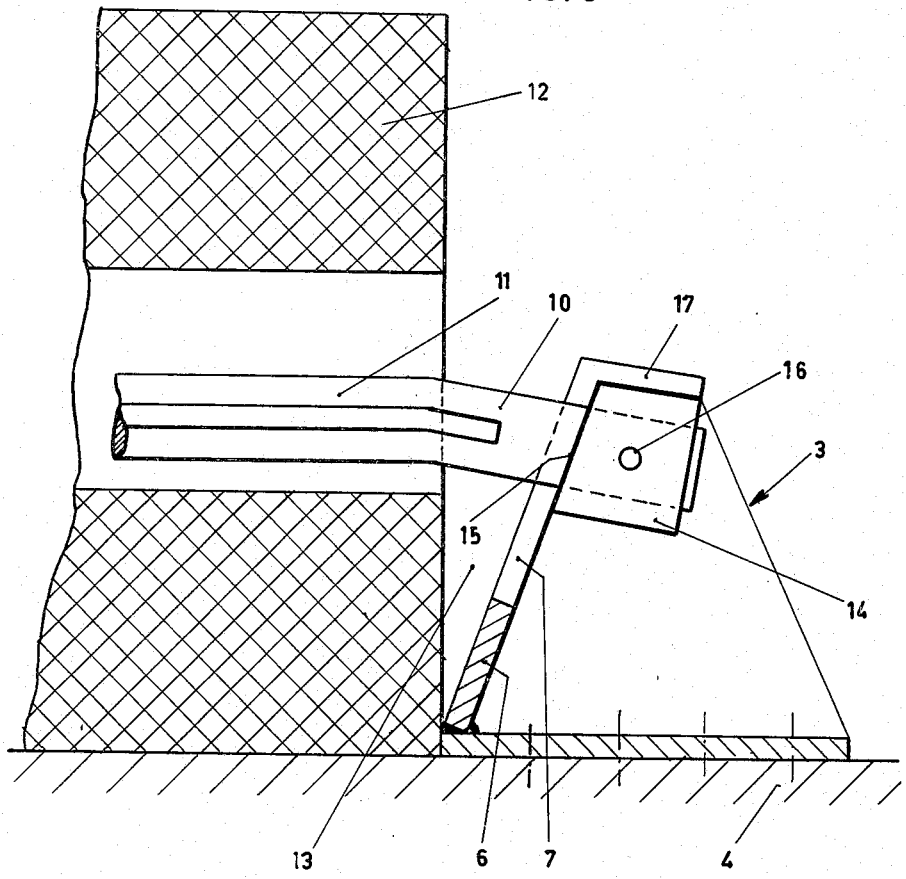
Figure 6:
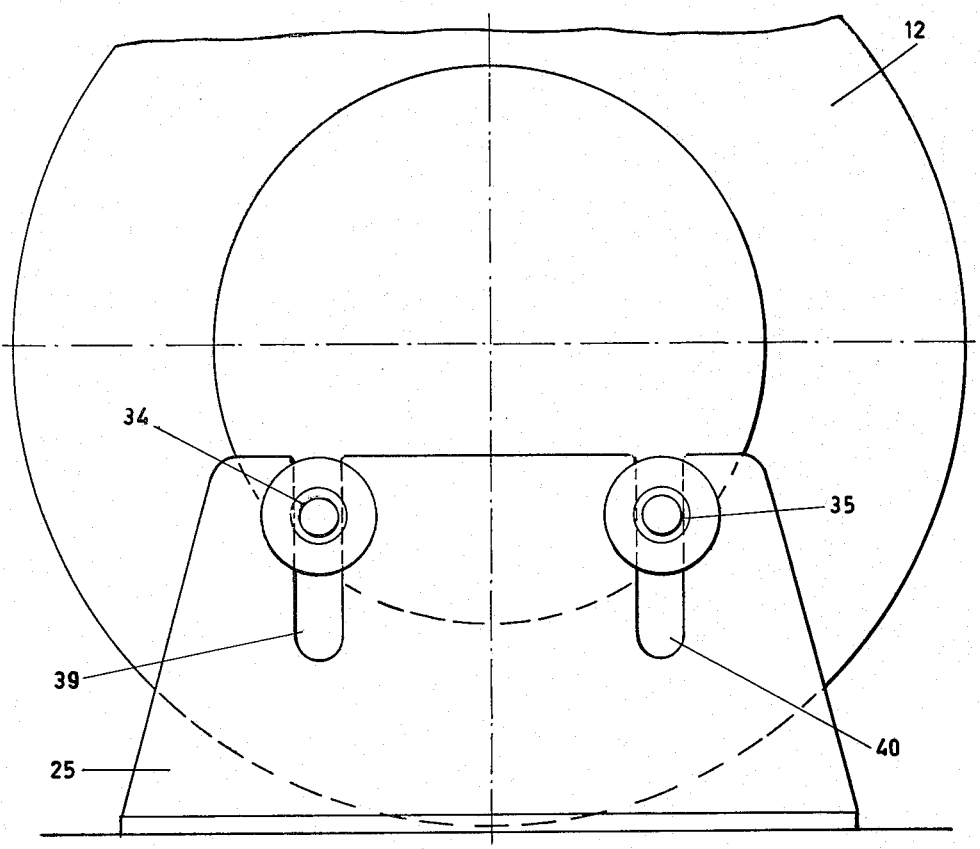

FIG. 1 diagrammatically a first embodiment;

FIG. 2 diagrammatically a second embodiment;

FIG. 3 diagrammatically a third embodiment;

FIG. 4 on larger scale a top plan view of the embodiment shown in FIG. 1;

FIG. 5 a section of part of the embodiment shown in FIG. 4;

FIG. 6 a side view of the embodiment shown in FIG. 3 and in

Figure 7:
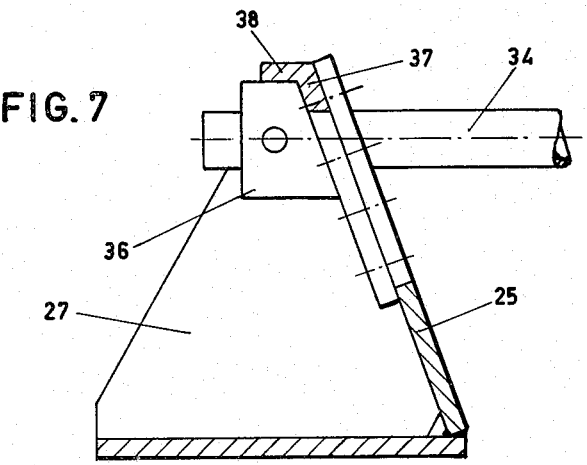

FIG. 7 on a larger scale part of the embodiment shown in FIG. 6.

The fender 1 shown in FIGS. 1, 4 and 5 comprises a suspension system consisting of two consoles 2, 3 which are secured to a quay wall 4, for example with the aid of anchoring bolts and nuts. The consoles 2 and 3 comprise a wall 5, 6 inclining relative to the quay wall 4 such that viewed from the quay said walls diverge. In said walls open slots 7, 8 are provided in which the ends 9, 10 of a frame structure 11 are arranged. As is apparent from FIGS. 1 and 5 said ends 9 and 10 decline in a direction towards the quay wall 4.

Around the frame structure 11 there is provided a hollow cylinder 12 of rubber, synthetic rubber or an elastic synthetic material, the end faces of which are perpendicular to the quay wall. Consequently at the unloaded condition of the hollow cylinder 12 between said hollow cylinder and of each of the walls 5, 6 there is a clearance 13.

In the event of a ship mooring to a quay equipped with such fenders 1, the cylinder 12 will be depressed and at a maximum load — which means at a load caused by the ship until the latter slips relative to the cylinder 12 — it will assume substantially the shape as shown in FIG. 1 in dotted lines. As is apparent therefrom the clearance 13 at the right hand side of the cylinder is not completely filled so that the end face of the cylinder 12 not abutting against the walls 7 and 8 of the console 3 defining said clearance cannot transmit forces to the console.

The ends 9 and 10 of the frame structure comprise cams 14 the face 15 of which facing the wall 6 extends parallel to said wall. The cams 14 are fixed non-slidably on the ends 9 and 10 with the aid of pins 16.

The walls 5 and 6 are each provided at their free end with an outwardly projecting strip 17 welded thereto which permits mounting of the frame structure and serves as a stop for the cams 14.

FIG. 2 shows an embodiment in which a cylinder 18 is provided between the consoles 19 and 20, the ends of said cylinder being chamfered such that between each of the walls 21 and 22 of the consoles 19 and 20 extending perpendicularly to the quay wall and the cylinder 18 there is a clearance 23 and 24 respectively. On account of a maximum load perpendicular to the cylinder 18 — which in unloaded condition is shown in full lines — said cylinder is depressed until its end faces assume the position as shown in dot and dash lines, while at a maximum load both in horizontal direction and in a direction perpendicular to the quay wall the cylinder 18 assumes the position as shown in dotted lines.

FIGS. 3, 6 and 7 show an embodiment of the fender according to the invention, according to which the walls 25, 26 of the consoles 27, 28 projecting relative to the quay wall are arranged relative to the quay 4 such that viewed from the quay they diverge relative to each other. The end faces 29, 30 of the cylinder 31 diverge relative to each other in a direction towards the quay wall 4. Consequently the clearances 32 and 33 between the walls 25 and 26 of the consoles 27 and 28 and the end faces 29 and 30 of the hollow cylinder can be much greater than in the embodiments according to the other FIGS.

The embodiment according to FIGS. 3, 6 and 7 furthermore differs from those according to the other FIGS. in that between the cams 36 provided on the shafts 34 and 35 and the walls 25 and 26 there is arranged a plate 37 provided with slots and outwardly projecting strip 38. Said strip 38 serves as a stop for the cams 36. This embodiment presents the advantage that the cams 36 can be provided on the ends of the shafts 34 and 35 before these shafts are mounted in the slots 39 and 40 of the walls 25 and 26 of the consoles 27 and 28. After the ends of these shafts are mounted in said slots there is slid between each of the cams 36 and the walls of the consoles a plate 37 which is secured with the aid of bolts to the walls 25 and 26.

The plates 37 comprise slots corresponding with the slots 39 and 40 and are each provided at their ends with a strip 38 serving as a stop for the cams 36.

It is obvious that the invention is not restricted to the embodiments of the fender described above and shown in the drawings, but that they can be modified in many ways without departing from the scope of the invention. The elastic hollow cylinders may also have a cross-section different from the circular one. It is also possible to arrange more than one cylinder between two consoles, said cylinders being co-axial. In that case it is preferred that the adjoining end faces of the cylinders are oppositely inclined so that between these end faces a clearance is formed which increases viewed from the quay wall. This entails the advantage that, although between two consoles or other supports two or more cylinders of elastic rubber are arranged, these cylinders can function independently of one another.

We claim:

1. A fender comprising a suspension structure adapted to be secured to a quay wall and a thick-walled cylinder of elastic material, such as rubber, synthetic rubber and other elastic synthetic material, said fender being provided with at least one shaft and two rigid consoles provided with slots for opposite ends of the shaft, said slots having open ends, the opposite ends of the shaft extending beyond said open slots being provided with abutment means co-operating with abutments of the consoles, said consoles projecting from the quay wall and being provided with means adapted to be secured to said quay wall, each of the consoles of the suspension structure having a side facing an adjacent end face of the cylinder and forming an angle with the adjacent end face of the cylinder in an unloaded condition of said cylinder.

2. A fender according to claim 1, characterized in that said abutment means comprise cams, between said cams and the side walls of the consoles of the suspension structure there are arranged plates which constitute said abutments of said consoles, said plates being provided with slots, the ends of said plates comprising externally thereof an abutment face for the cams.

3. A fender according to claim 1, characterized in that the side of said abutment means face the side walls of each of the consoles of the suspension structure at an inclination to end faces of said cylinder equal to the angle which said side walls are inclined to said end faces.

4. A fender comprising a suspension structure and a thick-walled hollow cylinder of elastic material, such as rubber, synthetic rubber and other elastic synthetic material, said suspension structure comprising at least one shaft having ends extending through said hollow cylinder formed with end faces and two rigid consoles each of which has a side adapted to be secured to a quay wall and a side projecting from said quay wall, the ends of said shaft extending beyond open slots provided in said sides of the consoles projecting from the quay wall, each of said ends of the shaft being provided with a cam, each of said cams co-operating with an abutment provided on the consoles between each of said cams and each side of the consoles projecting from the quay wall, said abutment being in the form of a plate having a slot and an abutting portion for said cam, each of said cams having an end face facing the said of the adjacent console, said end faces being inclined substantially at an inclination to said end faces equal to that which said side of the adjacent console is inclined to said end faces, each of which forms an angle with the adjacent side of the console projecting from said quay wall when the cylinder is in unlaoded position.

* * * * *